US012560524B2

(12) United States Patent
Nishimura

(10) Patent No.: US 12,560,524 B2
(45) Date of Patent: Feb. 24, 2026

(54) SAMPLE LIQUID ACCOMMODATION CONTAINER, SAMPLE LIQUID STIRRING DEVICE, MICROPARTICLE SORTING KIT, AND MICROPARTICLE SORTING DEVICE

(71) Applicant: Sony Group Corporation, Tokyo (JP)

(72) Inventor: Soh Nishimura, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 152 days.

(21) Appl. No.: 18/283,263

(22) PCT Filed: Feb. 15, 2022

(86) PCT No.: PCT/JP2022/005890
§ 371 (c)(1),
(2) Date: Sep. 21, 2023

(87) PCT Pub. No.: WO2022/209374
PCT Pub. Date: Oct. 6, 2022

(65) Prior Publication Data
US 2024/0159651 A1 May 16, 2024

(30) Foreign Application Priority Data
Mar. 31, 2021 (JP) ................................ 2021-059587

(51) Int. Cl.
*G01N 15/149* (2024.01)
*B01F 29/321* (2022.01)
(Continued)

(52) U.S. Cl.
CPC ......... *G01N 15/149* (2024.01); *B01F 29/321* (2022.01); *G01N 1/38* (2013.01);
(Continued)

(58) Field of Classification Search
CPC ............. G01N 15/149; G01N 15/1425; G01N 15/1459; G01N 1/38; G01N 2001/386;
(Continued)

(56) References Cited

U.S. PATENT DOCUMENTS 5,663,051 A * 9/1997 Vlasselaer ........... C12N 5/0093
436/514
5,840,502 A * 11/1998 Van Vlasselaer .. G01N 15/1459
436/514
(Continued)

FOREIGN PATENT DOCUMENTS

JP      2001-512967 A      8/2001
JP      2007-508530 A      4/2007
(Continued)

OTHER PUBLICATIONS

International Search Report and English translation thereof mailed May 10, 2022 in connection with International Application No. PCT/JP2022/005890.

*Primary Examiner* — Sang H Nguyen
(74) *Attorney, Agent, or Firm* — Wolf, Greenfield & Sacks, P.C.

(57) ABSTRACT

It is an object of the present technology to provide a sample liquid accommodation container that has favorable dispersibility of microparticles in a sample liquid when the sample liquid is stirred and allows the sample liquid to be easily taken out. The present technology provides a sample liquid accommodation container including: a container main body that has a bottomed cylindrical shape with an opening at one end and a bottom surface portion at another end, and accommodates a sample liquid containing microparticles; and a lid body that has a top surface portion and seals the opening of the container main body, in which the top surface portion of the lid body has a first through hole, and an inner
(Continued)

surface of the top surface portion of the lid body has an inclined surface inclined upward with the first through hole as a highest point.

10 Claims, 7 Drawing Sheets

(51) Int. Cl.
  *B01F 101/23*   (2022.01)
  *B01F 101/44*   (2022.01)
  *G01N 1/38*    (2006.01)

(52) U.S. Cl.
  CPC ....... *B01F 2101/23* (2022.01); *B01F 2101/44* (2022.01); *G01N 2001/386* (2013.01)

(58) Field of Classification Search
  CPC ........... G01N 2015/1006; B01F 29/321; B01F 2101/23; B01F 2101/44; B01F 31/22; B01L 3/5021; B01L 3/502761; B01L 2200/0652; B01L 2200/143; B01L 2300/0816; B01L 2400/0409; B01L 2400/0487
  See application file for complete search history.

(56)     References Cited

U.S. PATENT DOCUMENTS 6,197,579 B1 * 3/2001 Van Vlasselaer ...... C12M 47/12
                435/243
2010/0331163 A1 * 12/2010 Kitazawa ............. B01L 3/5021
                494/20

FOREIGN PATENT DOCUMENTS

| | | |
|---|---|---|
| JP | 2012-127922 A | 7/2012 |
| JP | 2017-181278 A | 10/2017 |
| JP | 2018-124201 A | 8/2018 |
| WO | WO 1998/035758 A1 | 8/1998 |
| WO | WO 2005/039773 A1 | 5/2005 |
| WO | WO 2017/169647 A1 | 10/2017 |

* cited by examiner

FIG. 4

SAMPLE LIQUID ACCOMMODATION CONTAINER, SAMPLE LIQUID STIRRING DEVICE, MICROPARTICLE SORTING KIT, AND MICROPARTICLE SORTING DEVICE

CROSS-REFERENCE TO RELATED APPLICATIONS

This application claims the benefit under 35 U.S.C. § 371 as a U.S. National Stage Entry of International Application No. PCT/JP2022/005890, filed in the Japanese Patent Office as a Receiving Office on Feb. 15, 2022, which claims priority to Japanese Patent Application Number JP2021-059587, filed in the Japanese Patent Office on Mar. 31, 2021, each of which is hereby incorporated by reference in its entirety.

TECHNICAL FIELD

The present technology relates to a sample liquid accommodation container that accommodates a sample liquid containing microparticles, a sample liquid stirring device that includes the sample liquid accommodation container, a microparticle sorting kit that includes the sample liquid accommodation container, and a microparticle sorting device that includes the sample liquid accommodation container.

BACKGROUND ART

A wide variety of devices have been developed so far for sorting microparticles. Examples of such devices include a flow cytometer. In a microparticle sorting system in a flow cytometer, a technique of forming a droplet containing a microparticle is used in some cases. In the technique, first, a laminar flow constituted by a sample liquid containing microparticles and a sheath liquid is discharged from an orifice formed in a flow cell or a microchip. Next, at the time of discharge, predetermined vibration is applied to the laminar flow to form droplets. Then, a moving direction of the formed droplets is electrically controlled on the basis of whether or not target microparticles are contained, and the target microparticles are sorted.

On the other hand, a technology for sorting target microparticles in a microchip without forming droplets as described above has also been developed. For example, Patent Document 1 below describes "a microchip comprising: a sample liquid feed channel for permitting a sample liquid containing a particulate to flow through; at least one pair of sheath liquid feed channels configured to merge to the sample liquid feed channel from both sides thereof for permitting a sheath liquid to flow through surrounding the sample liquid; a merging channel connected to the sample liquid feed channel and the at least one pair of the sheath liquid feed channels, for permitting the sample liquid and the sheath liquid to merge and flow through the merging channel; a vacuum suction unit connected to the merging channel, for absorbing and drawing into the particulate subject to collection; and at least one pair of discharge channels formed on both sides of the vacuum suction unit for permitting to flow through from the merging channel" (claim 1). In the microchip, the target microparticles are drawn and collected into the vacuum suction unit.

CITATION LIST

Patent Document
Patent Document 1: Japanese Patent Application Laid-Open No. 2012-127922

SUMMARY OF THE INVENTION

Problems To Be Solved By The Invention

Many microparticles have a specific gravity larger than that of water, and leaving a sample liquid containing microparticles to stand results in the microparticles settling and the sample liquid being partially increased in concentration. Thus, when the sample liquid is fed without being stirred, the high-concentration sample liquid flows in a microparticle sorting device, so that sorting processing may not be performed sufficiently and the sample liquid may be wasted in some cases. Furthermore, there are cases where clogging occurs in a liquid feeding tube due to the high-concentration sample liquid, which makes it difficult to stably feed the sample liquid.

Therefore, during microparticle sorting, it is desirable to stir a sample liquid accommodated in a container to disperse microparticles, thereby making the concentration of the sample liquid in the container uniform and keeping the concentration of the sample liquid fed from the container as constant as possible. Then, the container is desirably a container having favorable dispersibility of microparticles when the sample liquid is stirred. With this arrangement, it is easier to make the concentration of the sample liquid more uniform when the sample liquid is stirred.

Furthermore, when the sample liquid accommodated in the container described above is taken out for the purpose of collecting a residual liquid or the like, it is desirable that the sample liquid can be easily taken out from the container.

It is therefore a main object of the present technology to provide a sample liquid accommodation container that has favorable dispersibility of microparticles in a sample liquid when the sample liquid is stirred and allows the sample liquid to be easily taken out.

Solutions To Problems

That is, the present technology provides a sample liquid accommodation container including: a container main body that has a bottomed cylindrical shape with an opening at one end and a bottom surface portion at another end, and accommodates a sample liquid containing microparticles; and a lid body that has a top surface portion and seals the opening of the container main body, in which the top surface portion of the lid body has a first through hole, and an inner surface of the top surface portion of the lid body has an inclined surface inclined upward with the first through hole as a highest point.

An inner surface of the bottom surface portion of the container main body may have a deepest portion where a depth of the container main body is greatest and an inclined surface inclined downward toward the deepest portion.

The sample liquid accommodation container may include an outflow channel for allowing the sample liquid to flow out from the container main body, the top surface portion of the lid body may have a second through hole, and the outflow channel may pass via the second through hole and have one end that abuts against an inner surface of the bottom surface portion of the container main body.

The top surface portion of the lid body may have a third through hole, the sample liquid accommodation container may include an inflow channel for allowing the sample liquid to flow into the container main body, and the inflow channel may pass via the third through hole and have one end that is located upward with respect to a liquid level of the sample liquid inside the container main body.

The microparticles may be bioparticles.

The bioparticles may be cells.

The present technology also provides a sample liquid stirring device including: a sample liquid accommodation container that includes a container main body that has a bottomed cylindrical shape with an opening at one end and a bottom surface portion at another end, and accommodates a sample liquid containing microparticles, and a lid body that has a top surface portion and seals the opening of the container main body, in which the top surface portion of the lid body has a first through hole, and an inner surface of the top surface portion of the lid body has an inclined surface inclined upward with the first through hole as a highest point; a fixing portion that fixes the sample liquid accommodation container in such a way that a radial direction of the sample liquid accommodation container is horizontal; and a rotation portion that causes the fixing portion to perform a horizontal circular motion.

The present technology also provides a microparticle sorting kit including: a sample liquid accommodation container that includes a container main body that has a bottomed cylindrical shape with an opening at one end and a bottom surface portion at another end, and accommodates a sample liquid containing microparticles, and a lid body that has a top surface portion and seals the opening of the container main body, in which the top surface portion of the lid body has a first through hole, and an inner surface of the top surface portion of the lid body has an inclined surface inclined upward with the first through hole as a highest point; and a microchip that includes a sample liquid inlet into which the sample liquid that has flowed out from the sample liquid accommodation container is introduced, a main channel through which the introduced sample liquid flows, and a sorting channel where target microparticles are sorted from the sample liquid that has flowed through the main channel, in which the sample liquid accommodation container and the microchip are coupled.

The present technology also provides a microparticle sorting device including a sample liquid accommodation container that includes: a container main body that has a bottomed cylindrical shape with an opening at one end and a bottom surface portion at another end, and accommodates a sample liquid containing microparticles; and a lid body that has a top surface portion and seals the opening of the container main body, in which the top surface portion of the lid body has a first through hole, and an inner surface of the top surface portion of the lid body has an inclined surface inclined upward with the first through hole as a highest point.

The microparticle sorting device may further include a sample liquid stirring device that includes: a fixing portion that fixes the sample liquid accommodation container in such a way that a radial direction of the sample liquid accommodation container is horizontal; and a rotation portion that causes the fixing portion to perform a horizontal circular motion.

The microparticle sorting device may further include a microchip that includes a sample liquid inlet into which the sample liquid containing the microparticles is introduced, a main channel through which the introduced sample liquid flows, and a sorting channel where target microparticles are sorted from the sample liquid that has flowed through the main channel; a chip insertion unit into which the microchip is inserted; a light irradiation unit that irradiates the microparticles flowing through the main channel with light; a light detection unit that detects scattered light and/or fluorescence emitted from the microparticles; and a control unit that controls a traveling direction of the microparticles flowing through the main channel on the basis of data detected by the light detection unit.

In the microparticle sorting device, the sample liquid accommodation container and the microchip may be coupled, and a liquid feeding mechanism that feeds the sample liquid from the sample liquid accommodation container to the microchip may be further included.

In the microparticle sorting device, the sample liquid accommodation container and the microchip that are coupled may be a part of a microparticle sorting kit.

BRIEF DESCRIPTION OF DRAWINGS

FIG. 4 is a schematic diagram illustrating an example of a microparticle sorting kit.

MODE FOR CARRYING OUT THE INVENTION

Preferred embodiments for implementing the present technology will be described below with reference to the drawings. The embodiments described below illustrate representative embodiments of the present technology, and the scope of the present technology is not limited only to these embodiments. The present technology will be described in the following order.

1. First embodiment (sample liquid accommodation container)
  (1) Overall configuration
  (2) Configuration of container main body
  (3) Other configurations
  (4) Sample liquid
2. Second embodiment (sample liquid stirring device)
3. Third embodiment (microparticle sorting kit)
  (1) Overall Configuration
  (2) Configuration of Microchip
  (3) Other configurations
4. Fourth embodiment (microparticle sorting device)

1. FIRST EMBODIMENT (SAMPLE LIQUID ACCOMMODATION CONTAINER)

(1) Overall Configuration

Figure 1:
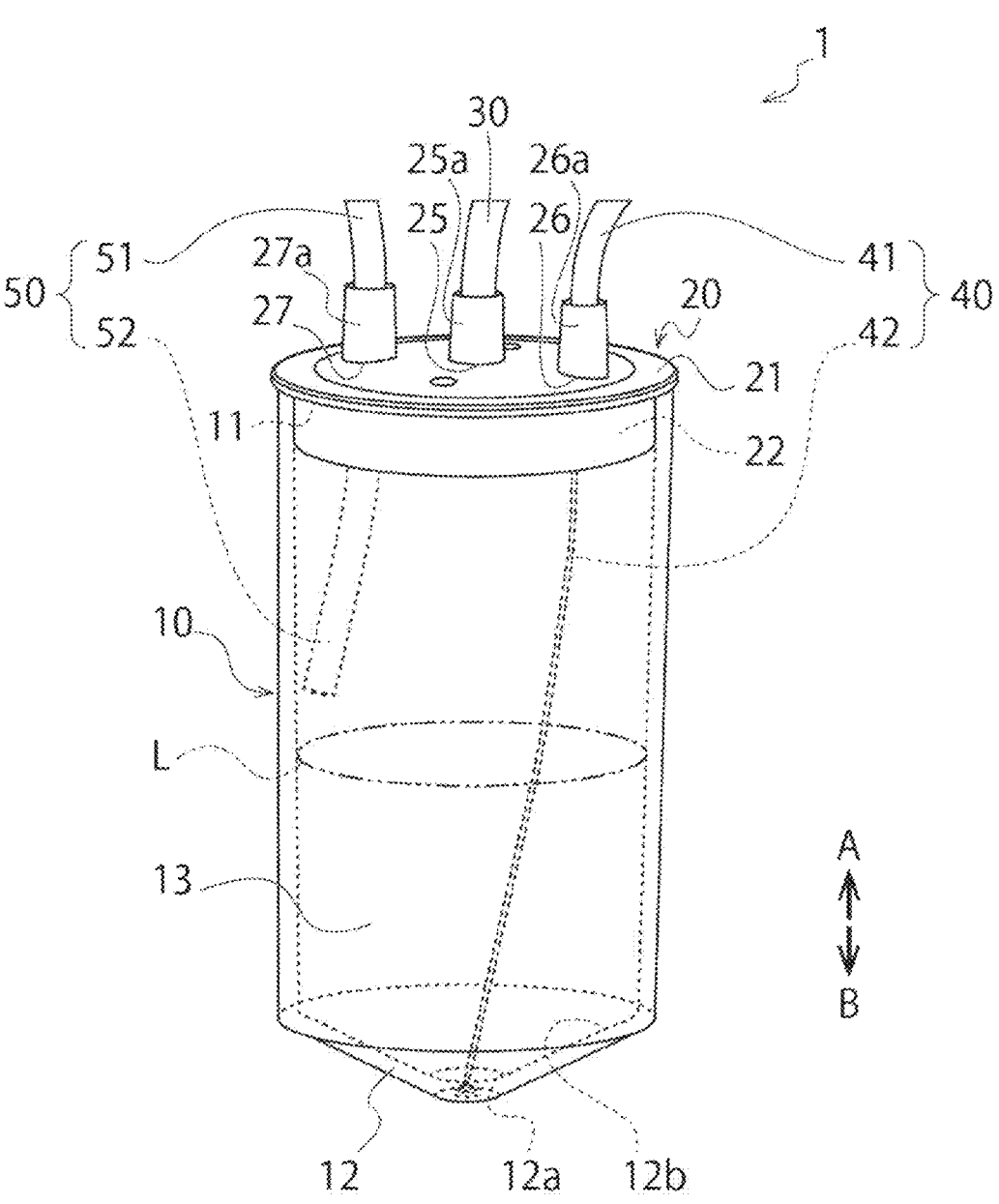
FIG. 1 is a schematic diagram illustrating an example of a sample liquid accommodation container.

An overall configuration of a sample liquid accommodation container 1 according to a first embodiment of the present technology will be described with reference to FIG. 1. FIG. 1 is a schematic diagram illustrating an example of the sample liquid accommodation container 1. The sample liquid accommodation container 1 includes a container main body 10 and a lid body 20. The container main body 10 has a bottomed cylindrical shape with an opening 11 at one end and a bottom surface portion 12 at the other end, and accommodates a sample liquid containing microparticles. The lid body 20 has a top surface portion 21, and seals the opening 11 of the container main body 10. In FIG. 1, an arrow A indicates a top surface direction of the sample liquid accommodation container 1, and an arrow B indicates a bottom surface direction of the sample liquid accommodation container 1.

The top surface portion 21 of the lid portion 20 may have a first through hole 25, a second through hole 26, and a third through hole 27. The sample liquid accommodation container 1 may include a vent pipe 30 connected to the first through hole 25. The sample liquid accommodation container 1 may include an outflow channel 40 that is connected to the second through hole 26 and allows the sample liquid to flow out from the container main body 10. The sample liquid accommodation container 1 may include an inflow channel 50 that is connected to the third through hole 27 and allows the sample liquid to flow into the container main body 10.

The sample liquid accommodation container 1 may be used in, for example, a technology for sorting microparticles, that is, may be for a microparticle sorting device. An example of a flow of a sample liquid in the microparticle sorting device will be described below.

The sample liquid before being accommodated in the sample liquid accommodation container 1 may be accommodated in, for example, a pre-sample accommodation unit included in the microparticle sorting device. The sample liquid accommodated in the pre-sample accommodation unit flows into the container main body 10 through the inflow channel 50. The sample liquid accommodation container 1 is shaken, and thus the sample liquid in the container main body 10 is stirred. With this arrangement, the microparticles in the sample liquid are dispersed. The sample liquid flows out from the container main body 10 through the outflow channel 40. The sample liquid is caused to flow into and out from the container main body 10 by, for example, driving of a pump included in the microparticle sorting device.

(2) Configuration of Container Main Body

Next, the configuration of the container main body 10 will be described with reference to FIG. 1. As described above, the container main body 10 has a bottomed cylindrical shape with the opening 11 at one end and the bottom surface portion 12 at the other end. The portion between the opening 11 and the bottom surface portion 12 is a body portion 13, and the body portion 13 has a cylindrical shape.

The cylindrical shape of the container main body 10 allows, when the container main body 10 is rotationally shaken, vibration generated by the rotational shaking to be transmitted better to the sample liquid. When the vibration is transmitted to the sample liquid, the sample liquid rotates. When the sample liquid rotates, the liquid level of the sample liquid becomes lower at the center and higher on the outside in the container main body 10 (that is, there is a difference in water level between the center and the outside), and this causes a difference in pressure (difference in weight) in the sample liquid. With this arrangement, a force due to a pressure gradient (that is, a centripetal force) is generated toward the center of the container main body 10. In the vicinity of the bottom surface portion 12 of the container main body 10, due to friction between the bottom surface portion 12 and the sample liquid, the centripetal force toward the center becomes larger than a centrifugal force toward the outside. Thus, due to the centripetal force, the sample liquid moves toward the vicinity of the center in the vicinity of the bottom surface portion 12, and then is blown up. Thereafter, the sample liquid moves toward the outside by the centrifugal force, and flows down again toward the bottom surface portion 12. A secondary flow (flow in the longitudinal direction of the container main body 10) due to such centrifugal force and centripetal force causes the sample liquid to be effectively stirred and the microparticles to be wound up, and, as a result, the microparticles are favorably dispersed. That is, the cylindrical shape of the container main body 10 allows for favorable dispersibility of the microparticles in the sample liquid when the sample liquid is stirred.

Here, types of the microparticle sorting device include a closed-type device that sorts microparticles in a closed space and an open-type device that sorts microparticles in an open space. This "closed" means that fluid communication with an external environment is not performed. In a closed microparticle sorting device, it is necessary to stir a sample liquid in a sample liquid accommodation container without using stirring means (e.g., a stirring rod) brought from outside. Thus, it is desirable that the sample liquid used in the closed microparticle sorting device is stirred by rotational shaking type stirring that does not require external stirring means. That is, the sample liquid accommodation container used in the closed microparticle sorting device is desirably rotationally shaken.

As described above, in the sample liquid accommodation container 1 of the present embodiment, the microparticles in the sample liquid are favorably dispersed by rotational shaking. Thus, the sample liquid accommodation container 1 is suitable for rotational shaking type stirring, and is particularly suitable for a sample liquid accommodation container for a closed microparticle sorting device.

The inner surface of the bottom surface portion 12 of the container main body 10 preferably has a deepest portion 12a where the depth of the container main body 10 is greatest, and an inclined surface 12b inclined downward toward the deepest portion 12a. In the present specification, the "inner surface of the bottom surface portion" is a surface located inside the container main body among the surfaces constituting the bottom surface portion. In the present specification, "downward" means a direction toward the bottom surface side of the sample liquid accommodation container, and "upward" means a direction toward the lid body side of the sample liquid accommodation container. In FIG. 1, "downward" means the direction of the arrow B.

Due to the inner surface of the bottom surface portion 12 having the deepest portion 12a and the inclined surface 12b inclined downward toward the deepest portion 12a, when the level of the sample liquid has become extremely low, the sample liquid is gathered into the deepest portion 12a. The gathered sample liquid is sucked up with the use of the outflow channel 40, and thus the amount of sample liquid that remains unsucked can be reduced. Moreover, one end of the outflow channel 40 (second outflow channel 42) abuts against the bottom surface portion 12 (in particular, the deepest portion 12a), and this allows the sample liquid guided to the deepest portion 12a of the bottom surface portion 12 to be efficiently sucked up. Thus, the amount of sample liquid that remains unsucked can be further reduced. The configuration of the outflow channel 40 will be described in (3) below.

As illustrated in FIG. 1, the inclined surface 12b inclined downward toward the deepest portion 12a is preferably disposed to surround the deepest portion 12a. With this arrangement, the sample liquid remaining on the inner surface of the bottom surface portion 12 can be efficiently gathered into the deepest portion 12a. Furthermore, as illustrated in FIG. 1, the inclined surface 12b may be constituted by, for example, a surface having a uniform inclination angle.

As illustrated in FIG. 1, for example, the deepest portion 12a may have a planar shape, and, in particular, may have a planar and circular shape. Furthermore, the deepest portion 12a may have, for example, a point-like shape or a linear shape.

The inner surface of the bottom surface portion 12 illustrated in FIG. 1 is constituted by the deepest portion 12a and the inclined surface 12b inclined downward toward the deepest portion 12a. Specifically, the inner surface of the bottom surface portion 12 illustrated in FIG. 1 is constituted by the planar and circular deepest portion 12a and the inclined surface 12b inclined downward from a lower edge of the cylindrical body portion 13 toward the deepest portion 12a. However, the inner surface of the bottom surface portion 12 may include a surface other than the deepest portion 12a and the inclined surface 12b. For example, the inner surface of the bottom surface portion 12 may have a horizontal surface provided so as to protrude horizontally from the lower edge of the cylindrical body portion 13 toward the inside of the container main body 10. Furthermore, for example, the inner surface of the bottom surface portion 12 may have a second inclined surface that is inclined from the lower edge of the cylindrical body portion 13 toward the inside of the container main body 10 and has an inclination angle different from that of the inclined surface 12b. In these examples, the inclined surface 12b may be provided between the horizontal surface or the second inclined surface and the deepest portion 12a.

The material of the container main body 10 is preferably a material that does not deform with a change in internal pressure. The pressure inside the container main body 10 may change with inflow and outflow of the sample liquid. The container main body 10 is formed by a material that does not deform with a change in internal pressure, so that the sample liquid can be stably accommodated. Furthermore, the container main body 10 may be formed by, for example, a transparent material so that the state of the accommodated sample liquid is visible. Examples of a transparent material that does not deform with a change in pressure include a synthetic resin that has high rigidity and is transparent, and specific examples thereof include transparent ABS resin, polycarbonate (PC), and polyethylene (PE). For example, in a case where the lid body 20 is formed by soft PVC as described later, the container main body 10 may be formed by transparent ABS resin that can be welded to soft PVC.

The volume of the container main body 10 may be appropriately set by those skilled in the art, and may be, for example, 1 mL or more and 1000 mL or less. Note that the volume of the container main body 10 means the volume obtained by excluding the volume of a headspace (space that is not filled with the sample liquid) necessary for inflow and outflow of the sample liquid, from the fully filled volume of the container main body 10. That is, the volume of the container main body 10 means the maximum volume of the sample liquid that can flow in and out.

The outer diameter of the body portion 13 of the container main body 10 may be, for example, 35 mm or more, preferably 40 mm or more, more preferably 45 mm or more, and still more preferably 47 mm or more. With the outer diameter of the container main body 10 being within such a numerical range, the sample liquid is more efficiently stirred when the container main body 10 is rotationally shaken, and the microparticles in the sample liquid can be more favorably dispersed.

The inner diameter of the body portion 13 of the container main body 10 can be appropriately set by those skilled in the art. For example, in a case where the outer diameter of the body portion 13 of the container main body 10 is 47 mm or more, the inner diameter thereof may be 43 mm or more.

The length of the container main body 10 in the longitudinal direction may be appropriately set by those skilled in the art in accordance with the volume, the outer diameter, and the like of the container main body 10.

(3) Other Configurations

Next, configurations other than that of the container main body 10 will be described with reference to FIG. 1. As described above, the lid body 20 has the top surface portion 21, and seals the opening 11 of the container main body 10. The top surface portion 21 may have any shape that allows for covering the circular opening 11, and may preferably have a circular shape. The lid body 20 may have, in addition to the top surface portion 21, a side surface portion 22 extending downward from the top surface portion 21. The side surface portion 22 may preferably be circular along the inner surface of the opening 11. With this arrangement, the opening 11 can be more reliably sealed.

Figure 2:
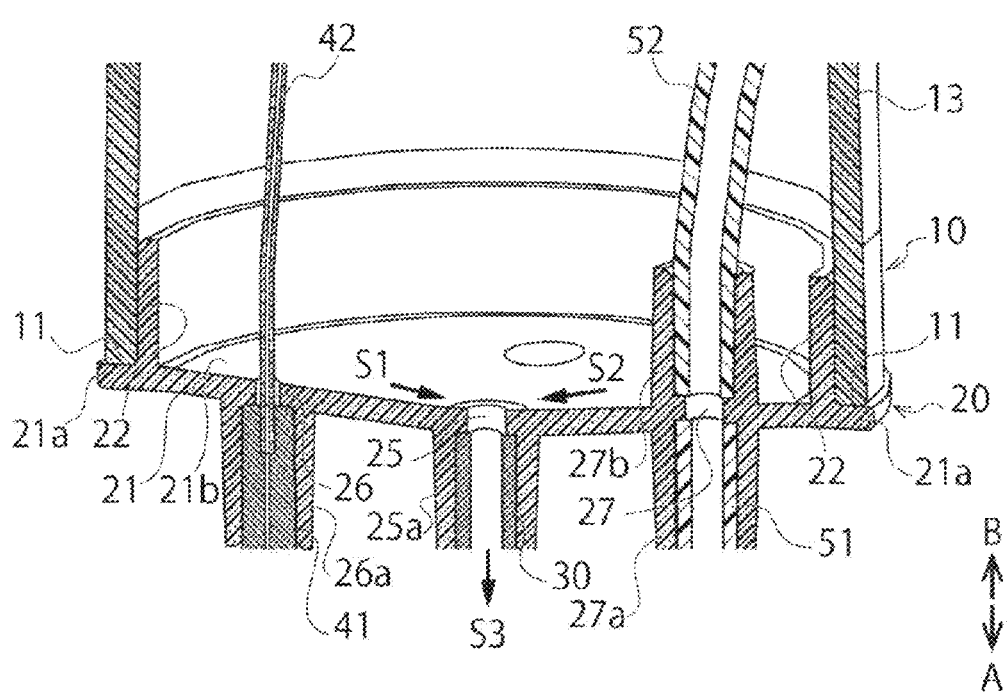
FIG. 2 is a cross-sectional view illustrating a lid body and the periphery thereof in a state where the sample liquid accommodation container is turned upside down.

The lid body 20 will be described with reference to FIG. 2. FIG. 2 is a cross-sectional view illustrating the lid body 20 and the periphery thereof in a state where the sample liquid accommodation container 1 is turned upside down. In FIG. 2, the direction toward the bottom surface of the sample liquid accommodation container 1, that is, "downward" in the present specification, is the direction of the arrow B, and the direction toward the lid body of the sample liquid accommodation container 1, that is, "upward" in the present specification, is the direction of the arrow A.

As illustrated in FIG. 2, the top surface portion 21 of the lid body 20 may have a top surface edge 21a and the side surface portion 22. The top surface edge 21a is provided along the peripheral edge of the top surface portion 21. The side surface portion 22 extends downward from the inside of the top surface edge 21a, and is circular along the inner surface of the opening 11. The side surface portion 22 is fitted inside the opening 11 of the container main body 10. Furthermore, the top surface edge 21a is in contact with the upper edge of the opening 11 in a state where the side surface portion 22 is fitted inside the opening 11. As illustrated in FIG. 2, the opening 11 and the lid body 20 may be combined to seal the opening 11.

The opening 11 and the lid body 20 may be combined and then welded together. With this arrangement, sealability between the opening 11 and the lid body 20 can be improved. Thus, leakage of the sample liquid accommodated in the container main body 10 can be more reliably prevented.

Configurations other than that of the container main body 10 will be further described with reference to FIGS. 1 and 2. The top surface portion 21 of the lid body 20 has the first through hole 25. The vent pipe 30 may be connected to the first through hole 25. The vent pipe 30 is provided for the purpose of effectively eliminating a pressure difference caused by the sample liquid flowing into and out from the container main body 10. The first through hole 25 may have an outer cylindrical portion 25a extending from the peripheral edge thereof toward the outside of the container. The vent pipe 30 may be connected to the first through hole 25 by being fitted inside the outer cylindrical portion 25*a*.

The top surface portion 21 of the lid body 20 may have the second through hole 26. The second through hole 26 is connected with the outflow channel 40 for allowing the sample liquid to flow out from the container main body 10. That is, the outflow channel 40 is a pipe that communicates the inside and the outside of the sample liquid accommodation container 1 via the second through hole 26. As illustrated in FIG. 1, one end of the outflow channel 40 is located outside the sample liquid accommodation container 1, and the other one end of the outflow channel 40 is located inside the container main body 10. The other one end of the outflow channel 40 may preferably abut against the inner surface of the bottom surface portion 12, and more preferably abut against the inner surface of the deepest portion 12*a* of the bottom surface portion 12. With one end of the outflow channel 40 located inside the container main body 10 abutting against the inner surface of the bottom surface portion 12 (in particular, the deepest portion 12*a*), when the sample liquid in the container main body 10 is sucked up and flows out, the amount of sample liquid that remains unsucked can be reduced.

The outflow channel 40 is formed by one or a plurality of members. The outflow channel 40 may be formed by, for example, two members, that is, a first outflow channel 41 and the second outflow channel 42. The first outflow channel 41 may be arranged toward the outside of the sample liquid accommodation container 1, and the second outflow channel 42 may be arranged toward the inside of the sample liquid accommodation container 1.

The second through hole 26 may have an outer cylindrical portion 26*a* extending from the peripheral edge thereof toward the outside of the container. One end of the first outflow channel 41 may be fitted inside the outer cylindrical portion 26*a*. One end of the second outflow channel 42 may be inserted into the second through hole 26 (see FIG. 2). The other one end of the second outflow channel 42 may abut against the inner surface of the bottom surface portion 12 (in particular, the deepest portion 12*a*) of the container main body 10 (see FIG. 1). In this way, the first outflow channel 41 and the second outflow channel 42 may be connected to the second through hole 26. With this arrangement, the outflow channel 40 passing via the second through hole 26 may be formed.

The top surface portion 21 of the lid body 20 may have the third through hole 27. The third through hole 27 is connected with the inflow channel 50 for allowing the sample liquid to flow into the container main body 10. That is, the inflow channel 50 is a pipe that communicates the inside and the outside of the sample liquid accommodation container 1 via the third through hole 27. One end of the inflow channel 50 is located outside the sample liquid accommodation container 1. The other one end of the inflow channel 50 may be located inside the container main body 10, and preferably be located upward with respect to the liquid level of the sample liquid inside the container main body 10. A virtual line L in FIG. 1 indicates an example of the position of the liquid level. Since one end of the inflow channel 50 is located upward with respect to the liquid level of the sample liquid inside the container main body 10, it is possible to prevent the sample liquid in the container main body 10 from returning to the inflow channel 50 due to differential pressure after all the sample liquid has flown into the container main body 10 via the inflow channel 50. Note that the "liquid level of the sample liquid" described above is a liquid level of a maximum volume specified in advance. Specifically, in the microparticle sorting device using the sample liquid accommodation container 1, the maximum volume of the sample liquid accommodated in the sample liquid accommodation container 1 may be specified in advance. The liquid level when the sample liquid of the specified maximum solution is accommodated is the "liquid level of the sample liquid" described above.

The inflow channel 50 is formed by one or a plurality of members. The inflow channel 50 may be formed by, for example, two members, that is, a first inflow channel 51 and a second inflow channel 52. The first inflow channel 51 may be arranged toward the outside of the sample liquid accommodation container 1, and the second inflow channel 52 may be arranged toward the inside of the sample liquid accommodation container 1.

The third through hole 27 may have an outer cylindrical portion 27*a* extending from the peripheral edge thereof toward the outside of the container and an inner cylindrical portion 27*b* extending from the peripheral edge thereof toward the inside of the container. One end of the first inflow channel 51 may be fitted inside the outer cylindrical portion 27*a*. One end of the second inflow channel 52 may be fitted inside the inner cylindrical portion 27*b* (see FIG. 2). The other one end of the second inflow channel 52 may be located upward with respect to the liquid level of the sample liquid (see FIG. 1). In this way, the first inflow channel 51 and the second inflow channel 52 may be connected to the third through hole 27. With this arrangement, the inflow channel 50 passing via the third through hole 27 may be formed.

The vent pipe 30, the outflow channel 40 (first outflow channel 41 and second outflow channel 42), and the inflow channel 50 (first inflow channel 51 and second inflow channel 52) may be combined with the lid body 20 and then welded together. With this arrangement, it is possible to improve airtightness of the sample liquid accommodation container 1, and more reliably prevent leakage of the sample liquid accommodated in the container main body 10.

The structure of the inside of the lid body 20 will be described with reference to FIG. 2. The inner surface of the top surface portion 21 of the lid body 20 has an inclined surface 21*b* inclined upward with the first through hole 25 as the highest point. Thus, turning the sample liquid accommodation container 1 upside down allows the sample liquid to be gathered into the first through hole 25 and taken out from the first through hole 25. In a case where the sample liquid is present on the inclined surface 21*b* illustrated in FIG. 2, the sample liquid may move toward the through hole 25 as indicated by arrows S1 and S2, for example. Then, the sample liquid passes via the first through hole 25, passes through the inside of the vent pipe 30, and is drained to the outside of the lid body 20 as indicated by an arrow S3.

In the sample liquid accommodation container 1 of the present embodiment, the vent pipe 30 may be provided for the purpose of effectively eliminating a pressure difference caused by inflow and outflow of the sample liquid. However, when the sample liquid accommodation container 1 is turned upside down for the purpose of taking out the sample liquid, the vent pipe 30 may serve as a drain path through which the sample liquid passes. Since the vent pipe 30 also serves as a drain path, it is not necessary to separately provide means for taking out the sample liquid, and the configuration of the sample liquid accommodation container 1 can be simplified.

In the sample liquid accommodation container 1, the opening 11 is sealed by the lid body 20. Thus, the lid body 20 and the opening 11 are in close contact with each other, and it is difficult to remove the lid body 20 from the opening 11 in some cases. Furthermore, the lid body 20 and another component are welded together for improved sealability in some cases. In this case, it is difficult to separate the welded members and remove the lid body 20 from the opening 11. Thus, for example, when collecting residual sample liquid, it is difficult to remove the lid body 20 and take out the sample liquid in some cases. However, in the sample liquid accommodation container 1 of the present embodiment, the sample liquid can be taken out just by turning the sample liquid accommodation container 1 upside down as described above. That is, the inside of the top surface portion 21 of the lid body 20 has the inclined surface 21b described above, and this allows the sample to be easily taken out.

As illustrated in FIG. 2, the inclined surface 21b inclined upward with the first through hole 25 as the highest point is preferably disposed to surround the first through hole 25. With this arrangement, when the sample liquid accommodation container 1 is turned upside down, the sample liquid on the inner surface of the top surface portion 21 is efficiently gathered into the first through hole 25. Thus, the sample liquid can be taken out more easily. Furthermore, as illustrated in FIG. 2, the inclined surface 21b may be constituted by, for example, a surface having a uniform inclination angle.

The inner surface of the top surface 21 of the lid body 20 may include a surface other than the inclined surface 21b inclined upward with the first through hole 25 as the highest point. For example, the inner surface of the top surface 21 may have a horizontal surface provided so as to protrude horizontally from the side surface portion 22 toward the inside of the container main body 10. Furthermore, for example, the inner surface of the top surface portion 21 may have a second inclined surface that is inclined from the side surface portion 22 toward the inside of the container main body 10 and has an inclination angle different from that of the inclined surface 21b. In these examples, the inclined surface 21b may be provided between the horizontal surface or the second inclined surface and the first through hole 25.

As described in "(2) Configuration of container main body" described above, the material of the lid body 20 is preferably a material that does not deform with a change in internal pressure. In a case where the lid body 20 is fitted inside the opening 11 to seal the opening 11, the material of the lid body 20 may be, for example, a material having flexibility. Furthermore, in a case where the lid body 20 and another member are welded together for improved sealability of the sample liquid accommodation container 1, the material of the lid body 20 may be, for example, a material having heat weldability. Examples of a material that does not deform with a change in internal pressure and has flexibility and heat weldability include soft polyvinyl chloride (soft PVC). By using soft PVC, the container main body 10 and the lid body 20 can be easily welded together.

The vent pipe 30, the outflow channel 40 (first outflow channel 41 and second outflow channel 42), and the inflow channel 50 (first inflow channel 51 and second inflow channel 52) may be, for example, tubes. The materials of the tubes may be appropriately selected by those skilled in the art. Furthermore, the cross-sectional dimensions of these channels may be appropriately set by those skilled in the art in accordance with the sample liquid that flows through the channels. For example, the materials of the tubes of the vent pipe 30, the first outflow channel, and the inflow channel 50 (first inflow channel 51 and second inflow channel 52) may be rubber such as butyl rubber, isoprene rubber, and natural rubber; a polymer elastomer such as a styrene-based elastomer, an olefin-based elastomer, a polyester-based elastomer, and a nylon-based elastomer; thermoplastic resin such as low-density polyethylene, high-density polyethylene, polypropylene, and cyclic polyolefin; or the like. Each of the tubes of the vent pipe 30, the first outflow channel, and the inflow channel 50 (first inflow channel 51 and second inflow channel 52) may be formed by a different material, or may be formed by the same material.

The tube of the second outflow channel 42 may be, for example, a PEEK tube that is $\frac{1}{16}$ inch in outer diameter and 0.5 mm in inner diameter, or 1 mm in inner diameter.

(4) Sample Liquid

A sample liquid that can be accommodated in the sample liquid accommodation container 1 of the present embodiment will be described. The sample liquid contains microparticles. Examples of the microparticles include bioparticles (biological microparticles) such as cells, cell masses, microorganisms, and ribosomes, or synthetic microparticles such as gel particles, beads, latex particles, polymer particles, and industrial particles.

The bioparticles described above may include chromosomes, ribosomes, mitochondria, and organelles (cell organelles) constituting various cells. The cells described above may include animal cells (e.g., blood cells) and plant cells. The cells may be particularly blood cells or tissue cells. The blood cells may be, for example, floating cells such as T cells or B cells. The tissue cells may be, for example, adherent cells separated from adherent cultured cells or tissues. The cell masses described above may include, for example, spheroids and organoids. The microorganisms described above may include bacteria such as *Escherichia coli*, viruses such as tobacco mosaic virus, and fungi such as yeast. Moreover, the bioparticles described above may also include biological polymers such as nucleic acids, proteins, and complexes thereof. These biological polymers may be, for example, those extracted from cells, or those contained in blood samples or other liquid samples.

The synthetic microparticles described above may be, for example, microparticles constituted by an organic or inorganic polymer material, metal, or the like. The organic polymer material may include polystyrene, a styrene/divinylbenzene copolymer, polymethyl methacrylate, and the like. The inorganic polymer material may include glass, silica, a magnetic material and the like. The metal may include gold colloid, aluminum, and the like. The synthetic microparticles may be, for example, gel particles or beads, and may be particularly gel particles or beads to which one or a combination of two or more selected from oligonucleotides, peptides, proteins, and enzymes are bound.

The shapes of the microparticles described above may be spherical or approximately spherical, or may be non-spherical. The size and mass of the microparticles may be appropriately selected by those skilled in the art. In the present technology, a chemical or biological label such as fluorescent dye or fluorescent protein, for example, may be attached to the microparticles as necessary. The label may make detection of the microparticles easier. The label to be attached can be appropriately selected by those skilled in the art. A molecule (e.g., antibody, aptamer, DNA, and RNA) that specifically reacts with the microparticles may be bound to the label.

In the present technology, the microparticles contained in the sample liquid may be preferably bioparticles, and more preferably cells.

2. SECOND EMBODIMENT (SAMPLE LIQUID STIRRING DEVICE)

A sample liquid stirring device according to a second embodiment of the present technology is a device that stirs a sample liquid by rotationally shaking the sample liquid accommodation container of the present technology described in 1. above. The sample liquid stirring device can favorably disperse microparticles in the sample liquid accommodated in the sample liquid accommodation container by performing rotational shaking type stirring.

The sample liquid stirring device described above may be used in, for example, a technology for sorting microparticles, that is, may be for a microparticle sorting device. Being a rotational shaking type stirring device, the sample liquid stirring device is suitable for a closed microparticle sorting device as described in 1. above. That is, the sample liquid stirring device may be particularly for a closed microparticle sorting device.

Figure 3:
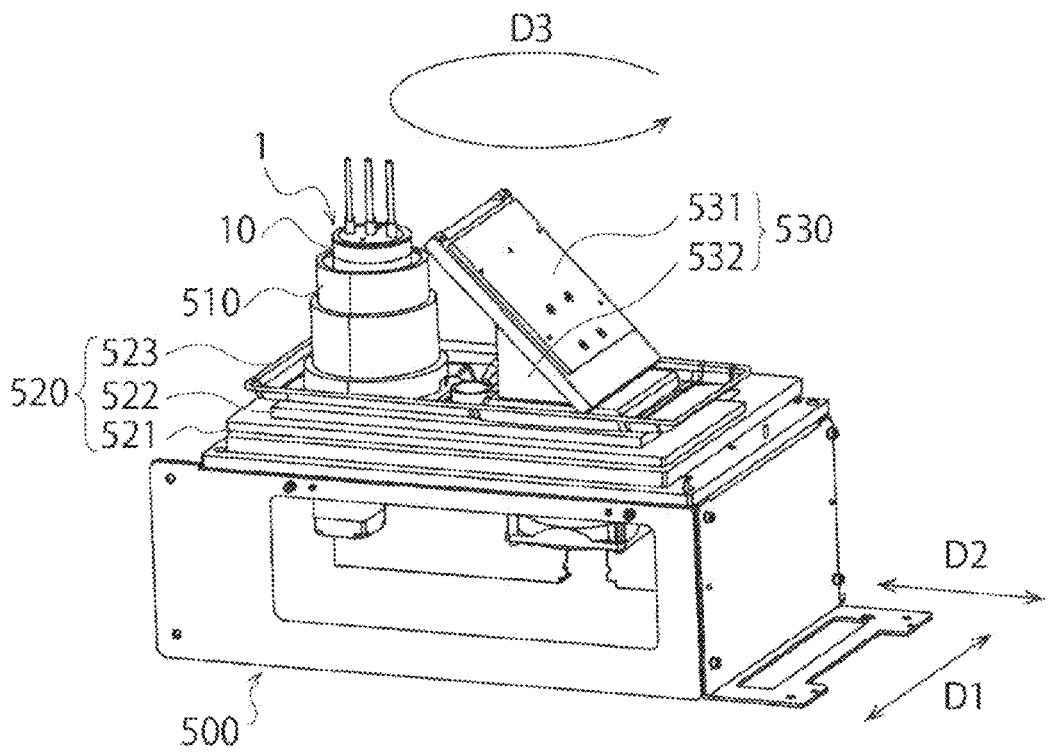
FIG. 3 is a schematic diagram illustrating an example of a sample liquid stirring device.

A sample liquid stirring device 500 of the present embodiment will be described with reference to FIG. 3. FIG. 3 is a schematic diagram illustrating an example of the sample liquid stirring device 500. The sample liquid stirring device 500 includes a sample liquid accommodation container 1, a fixing portion 510 that fixes the sample liquid accommodation container 1 in such a way that the radial direction of the sample liquid accommodation container 1 is horizontal, and a rotation portion 520 that causes the fixing portion 510 to perform a horizontal circular motion.

"Fixing the sample liquid accommodation container 1 in such a way that the radial direction of the sample liquid accommodation container 1 is horizontal" described above means fixing the sample liquid accommodation container 1 so that the longitudinal direction of the sample liquid accommodation container 1 is perpendicular to the surface on which the sample liquid stirring device 500 is installed.

The sample liquid accommodation container 1 fixed to the fixing portion 510 may be the container as described in 1. above, and the description thereof also applies to the sample liquid accommodation container 1 included in the sample liquid stirring device 500.

The fixing portion 510 may have, for example, a cylindrical cavity inside thereof. The sample liquid accommodation container 1 can be disposed in the cavity. The inner diameter of the cavity may be, for example, approximately equivalent to the outer diameter of a container main body 10 of the sample liquid accommodation container 1. The depth of the cavity may be, for example, 50% or more, 60% or more, or 70% or more of the length in the longitudinal direction of the container main body 10 of the sample liquid accommodation container 1. With the cavity having such an inner diameter and depth, the sample liquid accommodation container 1 can be more stably fixed.

As illustrated in FIG. 3, the rotation portion 520 may have, for example, a first plate portion 521, a second plate portion 522, and a third plate portion 523 in this order from the bottom. The fixing portion 510 may be disposed on the third plate portion 523. The first plate portion 521 may perform a reciprocating linear motion in a first horizontal direction (e.g., the direction of an arrow D1 illustrated in FIG. 1), for example. The second plate portion 522 may perform a reciprocating linear motion in a second horizontal direction (e.g., the direction of an arrow D2 illustrated in FIG. 1) orthogonal to the first horizontal direction, for example. For example, the third plate portion 523 may perform a horizontal circular motion by a movement obtained by combining these reciprocating linear motions that are horizontally orthogonal to each other. As a result, the fixing portion 523 disposed on the third plate portion 523 may perform a horizontal circular motion. In this way, the rotation portion 520 may cause the fixing portion 510 to perform a horizontal circular motion. An arrow D3 in FIG.

1 shows an example of the direction of the circular motion of the rotation portion 520 (third plate portion 523) and the fixing portion 510.

Power for causing the rotation portion 520 to perform a horizontal circular motion may be, for example, a motor. The type of the motor may be appropriately selected by those skilled in the art.

As described above, in the sample liquid stirring device 500 of the present embodiment, the fixing portion 510 performs a horizontal circular motion. With this arrangement, the sample liquid stirring device 500 can rotationally shake the sample liquid accommodation container 1 fixed to the fixing portion 510. By the rotational shaking, the sample liquid in the sample liquid accommodation container 1 is effectively stirred and mixed well. Thus, the sample liquid stirring device 500 can favorably disperse the microparticles in the sample liquid to make the concentration of the sample liquid in the sample liquid accommodation container 1 uniform. As a result, the sample liquid stirring device 500 can make the concentration of the sample liquid fed from the sample liquid accommodation container 1 close to constant.

The rotation portion 520 may cause the fixing portion 510 to perform a horizontal circular motion either in a continuous manner or in an intermittent manner. That is, the horizontal circular motion may be a continuous motion, or may be an intermittent motion. The intermittent motion is to repeat motion and stop. For example, the intermittent motion may be selected in a case where the concentration of the sample liquid fed from the sample liquid accommodation container 1 is close to constant when the horizontal circular motion is the intermittent motion. With this arrangement, a load applied to the power (e.g., a motor) for causing the rotation portion 520 to perform a horizontal circular motion can be reduced. For example, in a case where the intermittent motion results in an increase in fluctuation of the concentration of the sample liquid that is fed, the continuous motion may be selected. As described above, either the continuous motion or the intermittent motion may be selected for the horizontal circular motion depending on the fluctuation of the concentration of the sample liquid fed from the sample liquid accommodation container 1.

As illustrated in FIG. 3, the sample liquid stirring device 1 may further include a stand portion 530. The stand portion 530 may have, for example, an inclined plate portion 531 inclined with respect to a horizontal direction and a support portion 532 that supports the inclined plate portion 531. The stand portion 530 may be disposed on, for example, the third plate portion 523 of the rotation portion 520.

Microparticles sorted in the technology for sorting microparticles can be accommodated in, for example, a target sample storage unit. The stand portion 530 in the sample liquid stirring device 500 may be, for example, a stand on which the target sample storage unit is placed. That is, the microparticles to be sorted may be finally accommodated in the target sample storage unit via the sample liquid accommodation container 1. The target sample storage unit may have, for example, a sac-like shape.

3. THIRD EMBODIMENT (MICROPARTICLE SORTING KIT)

(1) Overall configuration

Figure 4:
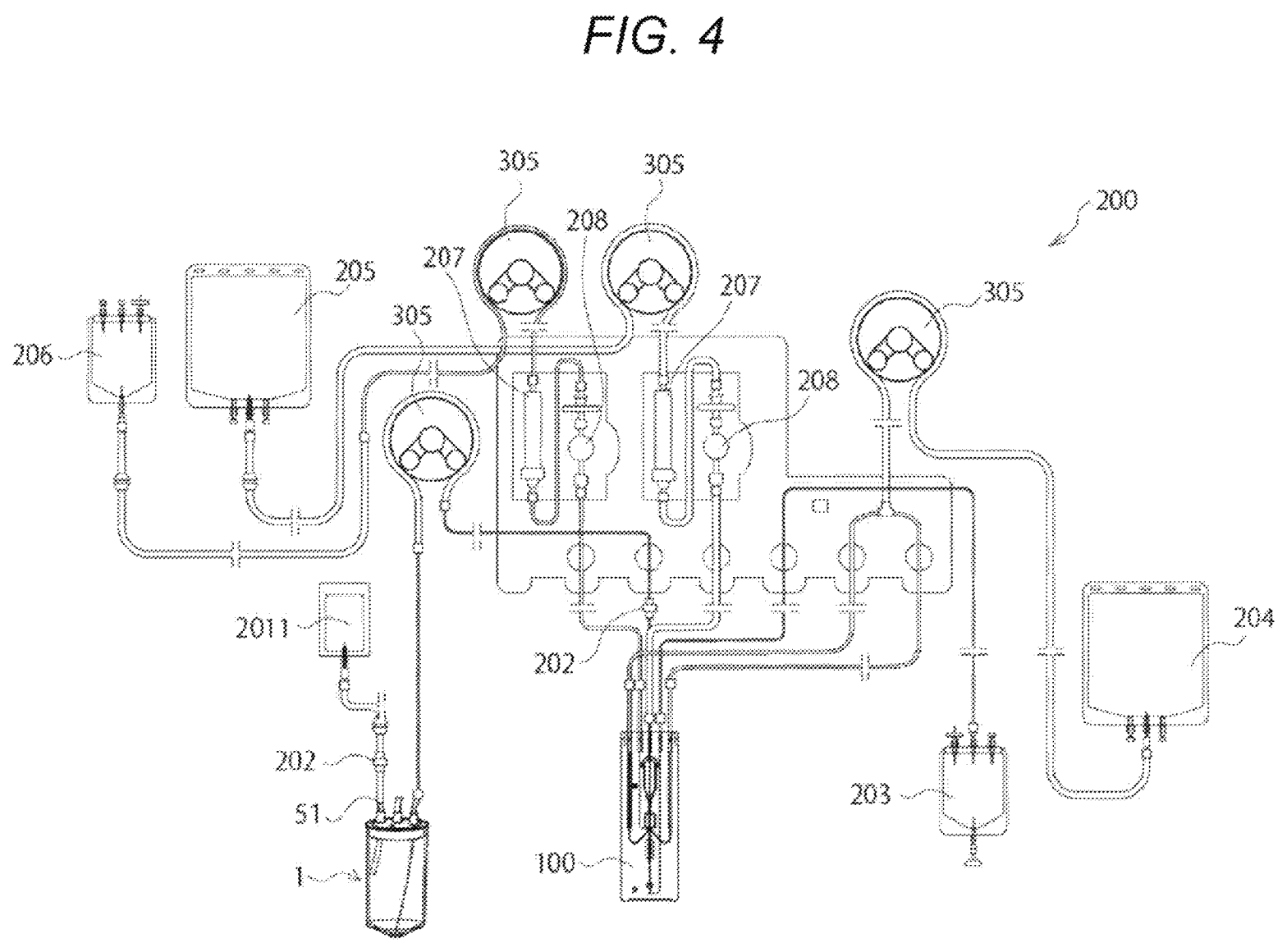

An overall configuration of a microparticle sorting kit 200 according to a third embodiment of the present technology will be described with reference to FIG. 4. FIG. 4 is a schematic diagram illustrating an example of the microparticle sorting kit 200.

The microparticle sorting kit 200 is a kit in which the sample liquid accommodation container 1 of the present technology described in 1. above and a microchip 100 are coupled. The sample liquid accommodation container 1 and the microchip 100 may be coupled by one or a plurality of coupling members.

The microchip 100 constituting the microparticle sorting kit 200 includes a sample liquid inlet into which a sample liquid that has flowed out from the sample liquid accommodation container 1 is introduced, a main channel through which the introduced sample liquid flows, and a sorting channel where target microparticles are sorted from the sample liquid that has flowed through the main channel. Details of the configuration of the microchip 100 will be described later.

The sample liquid accommodation container 1 constituting the microparticle sorting kit 200 may be the container as described in 1. above, and the description thereof also applies to the sample liquid accommodation container 1 constituting the microparticle sorting kit 200.

As described in 1. above, the sample liquid accommodation container 1 may be for a microparticle sorting device, and may be particularly for a closed microparticle sorting device. Thus, the microparticle sorting kit 200 of the present embodiment may also be particularly for a closed microparticle sorting device. It is desirable that the microparticle sorting kit has been sterilized and does not fluidly communicate with an external environment at the time of sorting.

(2) Configuration of Microchip

Figure 5:
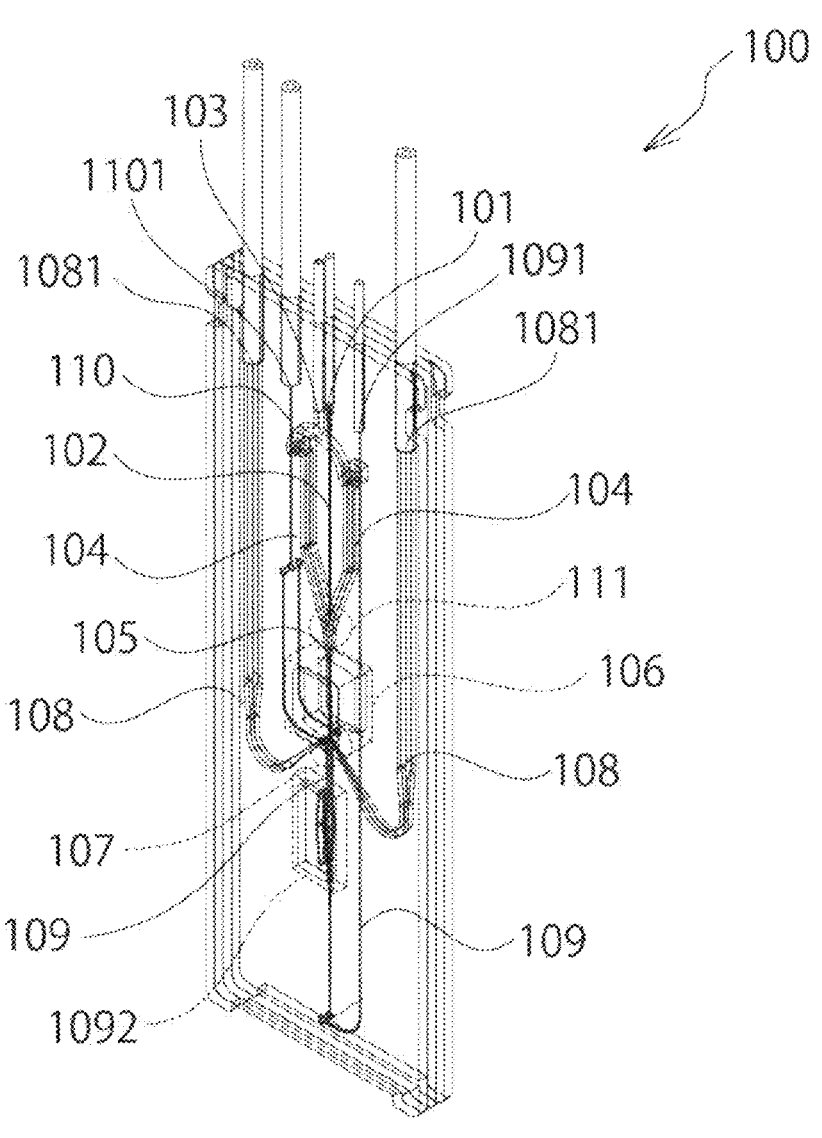
FIG. 5 is a schematic diagram illustrating an example of a microchip.

The configuration of the microchip 100 will be described with reference to FIG. 5. FIG. 5 is a schematic diagram illustrating an example of the microchip 100.

As illustrated in FIG. 5, the microchip 100 has a channel structure. In the microchip 100, a sample liquid inlet 101 and a terminal end 1091 of a sorting channel 109 are formed on the same side surface.

The microchip 100 is provided with the sample liquid inlet 101 into which a sample liquid is introduced, and a sheath liquid inlet 103 into which a sheath liquid is introduced. The sheath liquid inlet 103 is formed on the same side surface as the sample liquid inlet 101 and the terminal end 1091 of the sorting channel 109.

The sample liquid containing microparticles is introduced from the sample liquid inlet 101 into a sample liquid channel 102. The sheath liquid is introduced from the sheath liquid inlet 103 into a sheath liquid channel 104. The sheath liquid channel 104 branches into two sheath liquid channels 104 and 104. The two sheath liquid channels 104 and 104 pass through both sides of the sample liquid channel 102, and join with the sample liquid channel 102 at a joining portion 111. That is, each flow of the sheath liquid flowing through the sheath liquid channels 104 and 104 joins with the sample liquid flowing through the sample liquid channel 102 at the joining portion. With this arrangement, a laminar flow in which the sample liquid is surrounded by the sheath liquid is formed. The laminar flow flows through a main channel 105 toward a particle sorting unit 107.

The main channel 105 passes through an optical detection region 106. In the optical detection region 106, a microparticle in the sample liquid is irradiated with light. Whether or not the microparticle is to be sorted can be determined on the basis of fluorescence and/or scattered light generated by the irradiation of light. In the particle sorting unit 107 in the microchip 100, the laminar flow described above that has flowed through the main channel 105 is separated and flows into two branch channels 108 and 108.

Note that the particle sorting unit 107 illustrated in FIG. 5 has the two branch channels 108 and 108, but the number of branch channels is not limited to two. That is, the particle sorting unit 107 may be provided with, for example, one or a plurality of (e.g., two, three, or four) branch channels.

A terminal end 1081 of the branch channel 108 is formed on the same side surface as the sample liquid inlet 101 and the terminal end 1091 of the sorting channel 109.

In the particle sorting unit 107, only when a microparticle (also referred to as a "target sample") to be sorted has flowed in, a flow entering the sorting channel 109 is formed, and the target sample is sorted. The flow entering the sorting channel 109 may be formed, for example, by generating a negative pressure in the sorting channel 109. In order to generate the negative pressure, for example, an excitation region 1092 may be provided, and an actuator or the like may be attached to the outside of the microchip 100 so that the wall of the excitation region 1092 can be deformed. The deformation of the wall of the excitation region 1092 may change an inner space of the excitation region 1092, thereby generating the negative pressure.

The actuator described above may be, for example, a piezo actuator. When the target sample is sucked into the sorting channel 109, the sample liquid and/or the sheath liquid may also flow into the sorting channel 109. In this way, the target sample may be sorted.

The main channel 105 and the sorting channel 109 communicate with each other via an orifice portion coaxial with the main channel 105. The target sample flows through the orifice portion into the sorting channel 109.

In order to prevent microparticles that are not to be sorted from entering the sorting channel 109 through the orifice portion described above, the orifice portion may include a buffer liquid channel 110. A buffer liquid is introduced into the buffer liquid channel 110 from a buffer liquid inlet 1101. A part of the introduced buffer liquid forms a flow from the orifice portion toward the main channel 105, so that microparticles that are not to be sorted may be prevented from entering the sorting channel 109.

The buffer liquid inlet 1101 is formed on the same side surface as the sample liquid inlet 101 and the terminal end 1091 of the sorting channel 109. Note that the rest of the introduced buffer liquid described above may flow into the sorting channel 109.

The laminar flow described above that has flowed into the branch channel 108 may be discharged to the outside of the microchip 100 at the terminal end 1081 of the branch channel 108. Furthermore, the microparticles sorted into the sorting channel 109 may be discharged to the outside of the microchip at the terminal end 1091 of the sorting channel. In this way, the target sample is sorted by the microchip 100.

Channel connecting members may be inserted into the sample liquid inlet 101, the terminal end 1091 of the sorting channel 109, the sheath liquid inlet 103, the buffer liquid inlet 1101, and the terminal end 1081 of the branch channel 108. The microchip 100 may be coupled to other members included in the microparticle sorting kit 200 via the channel connecting members.

The channel connecting members described above may be, for example, tubes. The materials of the tubes may be appropriately selected by those skilled in the art. The tubes may be, for example, polyvinyl chloride (PVC) tubes, silicone tubes, polyetheretherketone (PEEK) tubes, polytetrafluoroethylene (PTFE) tubes, or thermoplastic elastomer tubes, or a plurality of types of tubes may be coupled.

In the present technology, "micro" means that at least a part of a channel included in the microchip has a dimension on the order of μm, particularly a cross-sectional dimension on the order of μm. That is, in the present technology, the "microchip" refers to a chip including a channel on the order of μm, particularly a chip including a channel having a cross-sectional dimension on the order of μm. For example, a chip including a particle sorting unit constituted by a channel having a cross-sectional dimension on the order of μm may be referred to as a microchip according to the present technology.

The microchip 100 may be manufactured by a method known in the technical field. For example, the microchip 100 may be manufactured by bonding two or more substrates on which a predetermined channel is formed.

Examples of the material of the microchip 100 include polycarbonate, cycloolefin polymer, polypropylene, polydimethylsiloxane (PDMS), polymethyl methacrylate (PMMA), polyethylene, polystyrene, glass, and silicon.

(3) Other Configurations

With reference to FIG. 4 again, configurations other than those of the sample liquid accommodation container 1 and the microchip 100 that can be included in the microparticle sorting kit 200 will be described.

In the microparticle sorting kit 200, a pre-sample accommodation unit 2011 may be provided upstream of the sample liquid accommodation container 1. A substance that suppresses aggregation of microparticles in the sample liquid may be accommodated in the pre-sample accommodation unit 2011. The pre-sample accommodation unit 2011, and a target sample storage unit 203, a waste unit 204, a sheath liquid accommodation unit 205, and a buffer liquid accommodation unit 206 described later may have, for example, a sac-like shape, and may be specifically plastic bags. Examples of the plastic bags may include polyethylene bags, polypropylene bags, polyvinyl chloride bags, or ethylene vinyl acetate copolymer bags.

As illustrated in FIG. 4, for example, a filter unit 202 may be connected upstream of the sample liquid accommodation container 1. Specifically, the filter unit 202 may be connected to a first inflow channel 51 of the sample liquid accommodation container 1. With this arrangement, it is possible to prevent foreign matter from getting inside the sample liquid accommodation container 1. Furthermore, for example, the filter unit 202 may be disposed between the sample liquid accommodation container 1 and the microchip 100. In particular, the filter unit 202 may be disposed immediately before the microchip 100. With this arrangement, it is possible to prevent foreign matter from getting inside the microchip 100.

The filter unit 202 may include, for example, a filter and a tapered portion located downstream of the filter. A sample liquid passes through the filter and then passes through the tapered portion. The tapered portion may prevent microparticles in the sample liquid from staying on an inner wall surface of the filter unit 202. Thus, the amount of microparticle loss can be reduced.

The filter unit 202 described above may further include a fitting portion as necessary. The fitting portion provides outer diameter fitting with a channel connecting member for connection with the sample liquid accommodation container 1 and/or the microchip 100.

The target sample storage unit 203 accommodates sorted microparticles. The target sample storage unit 203 has a structure capable of preventing accommodated microparticles from coming into contact with outer atmosphere. Thus, the target sample storage unit 203 may include, for example, an opening valve. The opening valve is a so-called check valve. The opening valve is coupled to the terminal end 1091 (see FIG. 5) of the sorting channel 109 of the microchip 100. When sorted microparticles have been accommodated in the target sample storage unit 203 via the opening valve, the opening valve can prevent backflow of the accommodated microparticles. Thus, leakage of microparticles can be prevented. Furthermore, it is possible to prevent microparticles from coming into contact with the outer atmosphere.

In the microchip 100 included in the microparticle sorting kit 200, when only target samples are sorted from a sample liquid, microparticles that are not to be collected (hereinafter also referred to as "non-target samples") need to be excluded. Furthermore, in the microchip 100, a sheath flow is used for sorting of the target samples, and it is therefore necessary to exclude a liquid containing non-target samples, a so-called waste liquid. Thus, the microparticle sorting kit 200 may include, for example, the waste unit 204. The waste unit 204 is where the non-target samples can be discarded. The waste liquid unit 204 may include, for example, a channel connecting member into which the waste liquid flows. The channel connecting member may communicate with the terminal end 1081 (see FIG. 5) of the branch channel 108 of the microchip 100. With this arrangement, the target samples can be sorted and the non-target samples can be discarded in a closed space.

Furthermore, in the microchip 100 included in the microparticle sorting kit, a sheath flow is formed. Thus, the microparticle sorting kit 200 may include, for example, the sheath liquid accommodation unit 205. The sheath liquid accommodation unit 205 accommodates a sheath liquid. The sheath liquid accommodation unit 205 may include, for example, a channel connecting member into which the sheath liquid flows. The channel connecting member may communicate with the sheath liquid inlet 103 (see FIG. 5) of the microchip 100. With this arrangement, the sheath liquid flows into the sheath liquid channel 104 of the microchip 100, and the sheath flow is formed. In order to drain the sheath liquid from the sheath liquid accommodation unit 205, for example, a drive source such as an actuator may be used.

The buffer liquid accommodation unit 206 accommodates a buffer liquid. The buffer liquid accommodation unit 206 may include, for example, a channel connecting member into which the buffer liquid flows. The channel connecting member may communicate with the buffer liquid inlet 1101 (see FIG. 5) of the microchip 100. With this arrangement, the buffer liquid flows into a channel in the microchip 100, and the target samples can be sorted. In order to drain the buffer liquid from the buffer liquid accommodation unit 206, for example, a drive source such as an actuator may be used.

When a part or all of a liquid in the microparticle sorting kit 200 is fed by a pump, fluctuation in flow rate (e.g., pulsation) caused by the pump may make an influence on the flow rate in the microchip 100 (in particular, the flow rate in the sorting channel 109) and sorting of microparticles in the particle sorting unit 107. In order to reduce the influence, the liquid feeding by the pump is desirably performed at a pressure as constant as possible. In order to keep the pressure by the liquid feeding as constant as possible, the microparticle sorting kit 200 may include dampers 207 and a pressure sensor 208 that gauges the pressure for each of the dampers 207. With this arrangement, liquid feeding can be stably performed. The dampers 207 and the pressure gauge sensor 208 may be disposed, in particular, in the channel between the sheath liquid accommodation unit 205 and the microchip and/or in the channel between the buffer liquid accommodation unit 206 and the microchip 100.

As illustrated in FIG. 4, the microparticle sorting kit 200 may further include a sample liquid feeding mechanism 305. The sample liquid feeding mechanism 305 may be disposed in the channel between the sample liquid accommodation container 1 and the microchip 100.

The sample liquid feeding mechanism 305 may be, for example, a pump. The pump may be, for example, a peristaltic pump (tube pump), a roller pump, a syringe pump, or a centrifugal pump. The pump may be a peristaltic pump or a roller pump, in particular, for more precise control of the flow rate.

The microparticle sorting kit 200 may include a plurality of the sample liquid feeding mechanisms 305 as necessary. For example, the sample liquid feeding mechanisms 305 may be disposed in one or a plurality of channels selected from the channel between the microchip 100 and the waste unit 204, the channel between the sheath liquid accommodation unit 205 and the microchip 100, and the channel between the buffer liquid accommodation unit 206 and the microchip 100.

In the microparticle sorting kit 200, some or all of the components can be coupled. The coupling may be particularly a sealed coupling. With the sealed coupling, sorting of target samples and storage of the target samples can be executed in a sealed space, and this improves the accuracy of sorting the target samples. Furthermore, the sealed coupling can prevent contamination of the microparticle sorting kit 200 itself by mist containing target samples and/or mixing of other substances into sorted target samples. Thus, the microparticle sorting kit 200 can be applied to clinical applications such as immune cell therapy that requires high-purity target samples. Furthermore, the microparticle sorting kit 200 may be disposable. With this arrangement, a risk of contamination between samples is avoided, and usability can be improved.

The microparticle sorting kit 200 may further include, for example, a microchip downstream of the target sample storage unit 203. With this arrangement, the target samples sorted from the sample liquid may be further sorted.

In the microparticle sorting kit 200, the quantity of each component may be one or more.

4. FOURTH EMBODIMENT (MICROPARTICLE SORTING DEVICE)

Figure 6:
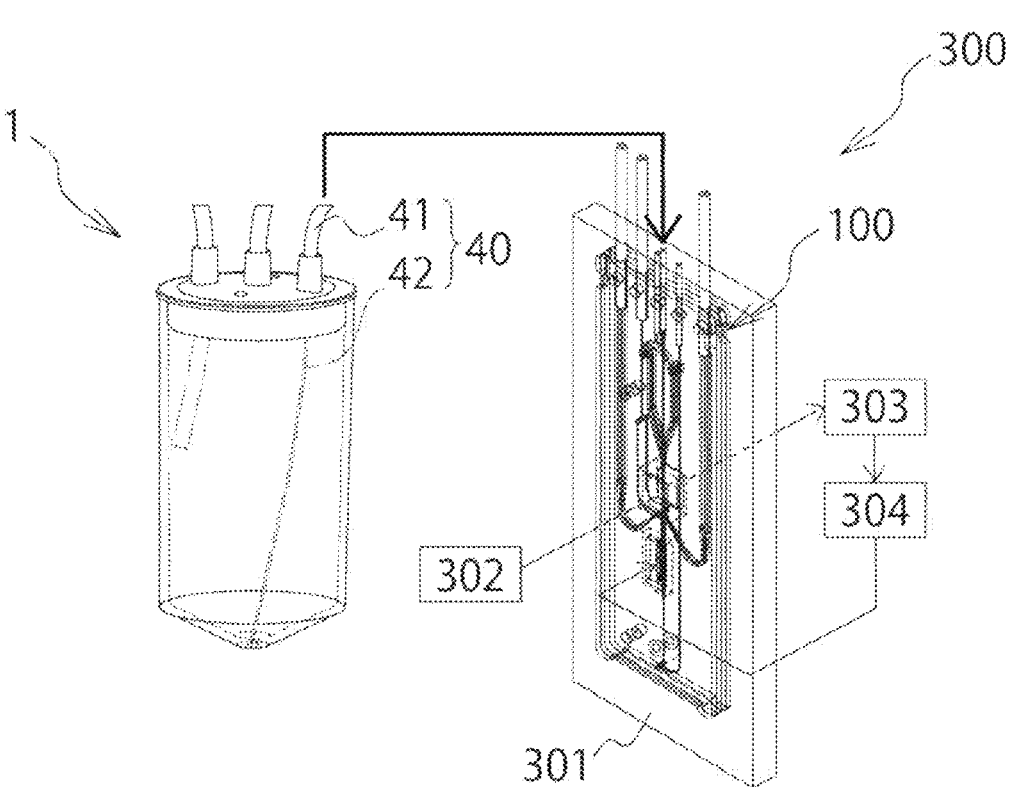
FIG. 6 is a schematic diagram illustrating a part of a microparticle sorting device.

A microparticle sorting device 300 according to a fourth embodiment of the present technology will be described with reference to FIG. 6. FIG. 6 is a schematic diagram illustrating a part of the microparticle sorting device 300.

The microparticle sorting device 300 includes a sample liquid accommodation container 1 of the present technology. The sample liquid accommodation container 1 may be the container as described in 1. above, and the description thereof also applies to the sample liquid accommodation container 1 included in the microparticle sorting device 300.

The microparticle sorting device 300 can effectively stir a sample liquid by shaking (in particular, rotationally shaking) the sample liquid accommodation container 1. With this arrangement, microparticles in the sample liquid are favorably dispersed, and the concentration of the sample liquid in the sample liquid accommodation container 1 can be made uniform. As a result, the microparticle sorting device 300 can make the concentration of the sample liquid fed from the sample liquid accommodation container 1 close to constant.

As described in 1. above, the sample liquid accommodation container 1 may be for a microparticle sorting device, and may be particularly for a closed microparticle sorting device. Similarly, the microparticle sorting device 300 of the present embodiment may be particularly a closed microparticle sorting device.

The microparticle sorting device 300 may further include a sample liquid stirring device (not illustrated) of the present technology. The sample liquid stirring device may be the device as described in 2. above, and the description thereof also applies to the sample liquid stirring device included in the microparticle sorting device 300.

The microparticle sorting device 300 can rotationally shake the sample liquid accommodation container 1 by the sample liquid stirring device. With this arrangement, the sample liquid in the sample liquid accommodation container 1 is effectively stirred and mixed well. Thus, the microparticle sorting device 300 can favorably disperse the microparticles in the sample liquid to make the concentration of the sample liquid in the sample liquid accommodation container 1 uniform. As a result, the microparticle sorting device 300 can make the concentration of the sample liquid fed from the sample liquid accommodation container 1 close to constant.

Here, a reference test example and a reference comparative example performed for the purpose of confirming an effect of the microparticle sorting device of the present technology will be described. In the reference test example and the reference comparative example, an event rate in the microparticle sorting device was measured. The event rate means the number of microparticles passing through a predetermined place per second, the microparticles being contained in a sample liquid fed from a container. As the event rate measured over time is closer to constant, it can be determined that the concentration of the sample liquid fed from the container is closer to constant.

Figure 7:
FIG. 7 is a graph showing results of a reference test example.
Figure 7:
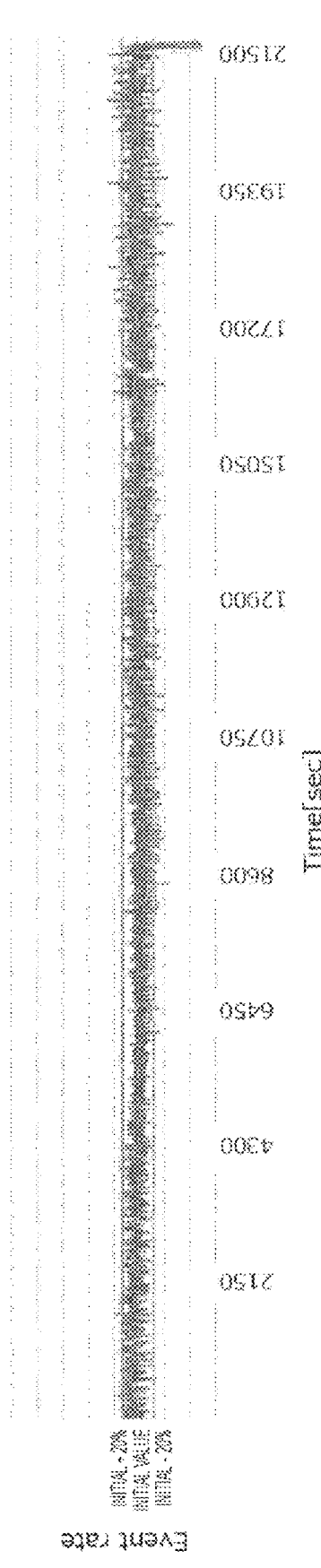
Figure 8:
FIG. 8 is a graph showing results of a reference comparative example.
Figure 8:
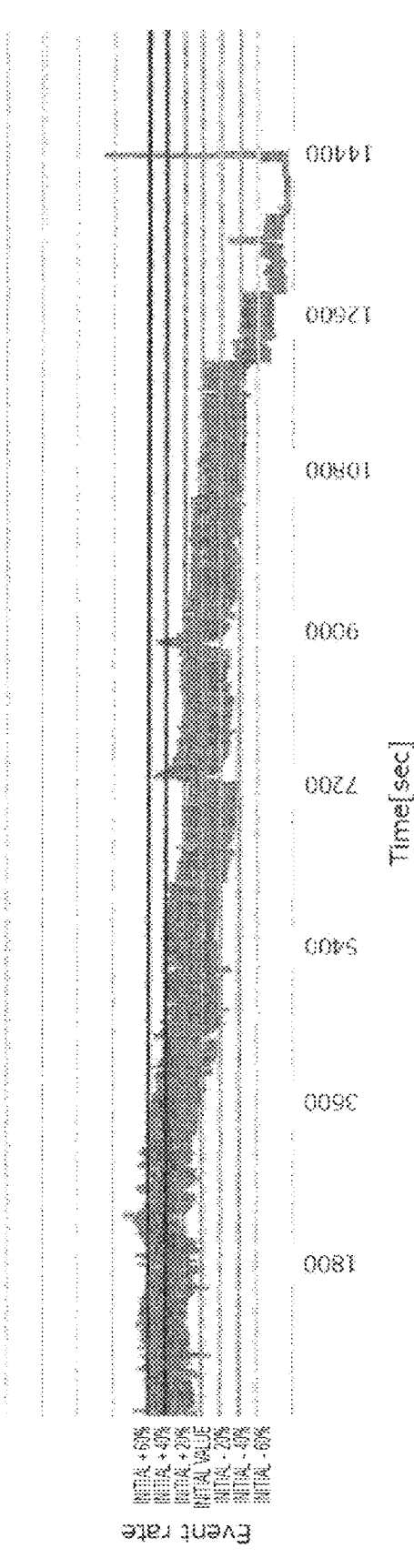

FIG. 7 is a graph showing results of the reference test example. FIG. 8 is a graph showing results of the reference comparative example. In these graphs, the vertical axis shows the rate of fluctuation with respect to an event rate initial value, and the horizontal axis shows time (unit: second).

In the reference test example described above, the microparticle sorting device of the present technology that includes the sample liquid accommodation container of the present technology and the sample liquid stirring device of the present technology was used. In the reference test example, the event rate was measured while the sample liquid accommodation container was rotationally shaken by the sample liquid stirring device. As a result, the event rate was maintained substantially constant until 21500 seconds (about 6 hours) elapsed as illustrated in FIG. 7. From the results, it has been confirmed that the microparticle sorting device of the present technology can make the concentration of the sample liquid fed from the sample liquid accommodation container substantially constant. Furthermore, it has been confirmed that the microparticle sorting device of the present technology can maintain a substantially constant concentration of the sample liquid for a long time (e.g., six hours).

In the reference comparative example described above, a microparticle sorting device for comparison that includes a sample liquid accommodation bag and the sample liquid stirring device of the present technology was used. That is, the reference comparative example is different from the reference test example described above in that a sack-shaped container is used instead of the sample liquid accommodation container of the present technology. In the reference comparative example, the event rate was measured while the sample liquid accommodation bag was rotationally shaken by the sample liquid stirring device. As illustrated in FIG. 8, the fluctuation in event rate was larger than that in the reference test example described above. In particular, after the lapse of 3600 seconds (1 hour), the event rate decreased with the lapse of time.

From the results of the reference test example and the reference comparative example, it has been confirmed that rotationally shaking the sample liquid accommodation container of the present technology allows the concentration of the sample liquid that is fed in the microparticle sorting device to be maintained substantially constant for a long time.

The configuration of the microparticle sorting device 300 of the present technology will be further described with reference to FIG. 6 again. The microparticle sorting device 300 may further include a microchip 100. The microchip 100 includes a sample liquid inlet into which a sample liquid containing microparticles is introduced, a main channel through which the introduced sample liquid flows, and a sorting channel where target microparticles are sorted from the sample liquid that has flowed through the main channel. The microchip 100 may be the microchip as described in 3. (2) above, and the description thereof also applies to the microchip 100 included in the microparticle sorting device 300.

In the microparticle sorting device 300, the sample liquid accommodation container 1 and the microchip 100 may be coupled, and may be coupled by, for example, one or a plurality of coupling members. For example, the sample liquid accommodation container 1 and the microchip 100 may be coupled such that the sample liquid flowing out from an outflow channel 40 (first outflow channel 41 and second outflow channel 42) of the sample liquid accommodation container 1 may flow into the microchip 100.

The sample liquid accommodation container 1 and the microchip 100 that are coupled may be a part of a microparticle sorting kit (see FIG. 4). That is, the microparticle sorting device 300 may include a microparticle sorting kit. The microparticle sorting kit may be the kit as described in 3. above, and the description thereof also applies to the microparticle sorting kit included in the microparticle sorting device 300.

As illustrated in FIG. 6, in a case of including the microchip 100, the microparticle sorting device 300 may further include a chip insertion unit 301 into which the microchip 100 is inserted, a light irradiation unit 302 that irradiates a microparticle flowing through the main channel described above with light, a light detection unit 303 that detects scattered light and/or fluorescence emitted from the microparticle, and a control unit 304 that controls a traveling direction of the microparticle flowing through the main channel on the basis of data detected by the light detection unit 303. The chip insertion unit 301, the light irradiation unit 302, the light detection unit 303, and the control unit 304 will be further described below.

The chip insertion unit 301 has a structure into which the microchip 100 is inserted. The structure may be appropriately selected by those skilled in the art.

The light irradiation unit 302 irradiates, with light (e.g., excitation light), a microparticle flowing through a main channel 105 (see FIG. 5) passing through an optical detection region 106. The light irradiation unit 302 may include, for example, a light source and an objective lens. The light source emits light toward the main channel. The light source may be appropriately selected by those skilled in the art in accordance with the purpose of sorting or the like, and may be, for example, a laser diode, an SHG laser, a solid-state laser, a gas laser, or a high-intensity LED, or may be a combination of two or more thereof. The objective lens gathers light (e.g., excitation light) for the microparticle flowing through the optical detection region 106.

The light irradiation unit 302 may further include another optical element as necessary. For example, the light irradiation unit 302 may irradiate one position in the optical detection region 106 with light, or may irradiate each one of a plurality of positions with light. For example, the light irradiation unit 302 may irradiate each of two different positions in the optical detection region 106 with light.

The light detection unit 303 detects scattered light and/or fluorescence emitted from the microparticle by light irradiation by the light irradiation unit 302. The light detection unit 303 may include, for example, a condenser lens and a detector. The condenser lens gathers scattered light and/or fluorescence emitted from the microparticle. The detector may be, for example, a PMT, a photodiode, a CCD, or a CMOS.

The light detection unit 303 may further include another optical element as necessary. The light detection unit 303 may further include, for example, a spectroscopic unit. Examples of an optical component constituting the spectroscopic unit may include a grating, a prism, and an optical filter. Including the spectroscopic unit allows the light detection unit 303 to detect light having a wavelength to be detected, separately from light having other wavelengths, for example.

The fluorescence detected by the light detection unit 303 may be, but is not limited to, fluorescence emitted from the microparticle itself and fluorescence emitted from a substance (e.g., a fluorescent substance) labeled on the microparticle. The scattered light detected by the light detection unit 303 may be forward scattered light, side scattered light, Rayleigh scattering, Mie scattering, or a combination thereof.

The control unit 304 controls the traveling direction of the microparticle flowing through the main channel 105 on the basis of data (e.g., information regarding light) detected by the light detection unit 303. For example, the control unit 304 controls sorting of the microparticle on the basis of the data. For example, in a case where light detected by the light detection unit 303 satisfies a predetermined standard, the control unit 304 may determine that the microparticle is to be sorted. From light (scattered light and/or fluorescence) detected by the light detection unit 303, information regarding the light may be generated. The information may be generated, for example, by converting the light into an electric signal. In order to generate the information, the microparticle sorting device 300 may include an information generation unit configured to generate, from light detected by the light detection unit 303, information regarding the light. The information generation unit may be included in the control unit 304, or may be provided in the microparticle sorting device 300 as a component different from the control unit 304 without being included in the control unit 304. The control unit 304 may determine whether or not the light detected by the light detection unit 303 satisfies a predetermined standard on the basis of the information regarding the light. The control unit 304 may control sorting of the microparticle on the basis of a result of the determination.

In a case where it is determined that the microparticle is to be sorted on the basis of the result of the determination described above, the control unit 304 may change the flow in the channel so that the microparticle travels to a sorting channel 109 (see FIG. 5) through an orifice. The flow may be changed, for example, by decreasing the pressure in the sorting channel 109. Furthermore, after the microparticle has been sorted, the control unit 304 may change the flow in the channel again. The flow may be changed again by increasing the pressure in the sorting channel 109. That is, the control unit 304 may control the pressure in the sorting channel 109 on the basis of the information regarding the light detected by the light detection unit 303.

The control unit 304 may have a function similar to that of the drive unit described in Japanese Patent Application Laid-Open No. 2014 036604, for example. That is, the control unit 304 can control an actuator configured to generate a negative pressure in the sorting channel 109. In a case where it is determined that the microparticle is to be sorted on the basis of the information regarding the light described above, the control unit 304 drives the actuator to generate a negative pressure in the sorting channel 109. With this arrangement, the microparticle to be sorted is sorted into the sorting channel 109. In a case where it is determined that the microparticle is not to be sorted on the basis of the information regarding the light described above, the control unit 304 does not drive the actuator. Thus, the microparticle that is not to be sorted flows into a branch channel 108.

The actuator described above may be, for example, a piezoelectric element such as a piezo element. In a case where it is determined that the microparticle is to be sorted, the control unit 304 applies a voltage that causes piezoelectric contraction to the piezo element, to increase the volume in the sorting channel 109. As the volume increases, a negative pressure is generated in the sorting channel 109. With this arrangement, a flow from the main channel 105 to the sorting channel 109 is formed, and the microparticle is sorted into the sorting channel 109. In a case where it is determined that the microparticle is not to be sorted, the control unit 304 does not apply a voltage to the piezo element. Thus, a flow into the sorting channel 109 is not formed, and the microparticle flows into the branch channel 108.

In the present technology, the following configuration can also be adopted.

[1] A sample liquid accommodation container including:

a container main body that has a bottomed cylindrical shape with an opening at one end and a bottom surface portion at another end, and accommodates a sample liquid containing microparticles; and a lid body that has a top surface portion and seals the opening of the container main body, in which the top surface portion of the lid body has a first through hole, and an inner surface of the top surface portion of the lid body has an inclined surface inclined upward with the first through hole as a highest point.

[2] The sample liquid accommodation container according to [1], in which an inner surface of the bottom surface portion of the container main body has a deepest portion where a depth of the container main body is greatest and an inclined surface inclined downward toward the deepest portion.

[3 ] The sample liquid accommodation container according to [1] or [2], in which the sample liquid accommodation container includes an outflow channel for allowing the sample liquid to flow out from the container main body, the top surface portion of the lid body has a second through hole, and the outflow channel passes via the second through hole, and has one end that abuts against an inner surface of the bottom surface portion of the container main body.

[4] The sample liquid accommodation container according to any one of [1] to [3], in which the top surface portion of the lid body has a third through hole, the sample liquid accommodation container includes an inflow channel for allowing the sample liquid to flow into the container main body, and the inflow channel passes via the third through hole, and has one end that is located upward with respect to a liquid level of the sample liquid inside the container main body.

[5] The sample liquid accommodation container according to any one of [1] to [4], in which the microparticles are bioparticles.

[6] The sample liquid accommodation container according to [5], in which the bioparticles are cells.

[7] A sample liquid stirring device including:

a sample liquid accommodation container that includes a container main body that has a bottomed cylindrical shape with an opening at one end and a bottom surface portion at another end, and accommodates a sample liquid containing microparticles, and a lid body that has a top surface portion and seals the opening of the container main body, in which the top surface portion of the lid body has a first through hole, and an inner surface of the top surface portion of the lid body has an inclined surface inclined upward with the first through hole as a highest point;

a fixing portion that fixes the sample liquid accommodation container in such a way that a radial direction of the sample liquid accommodation container is horizontal; and a rotation portion that causes the fixing portion to perform a horizontal circular motion.

[8] A microparticle sorting kit including:

a sample liquid accommodation container that includes a container main body that has a bottomed cylindrical shape with an opening at one end and a bottom surface portion at another end, and accommodates a sample liquid containing microparticles, and a lid body that has a top surface portion and seals the opening of the container main body, in which the top surface portion of the lid body has a first through hole, and an inner surface of the top surface portion of the lid body has an inclined surface inclined upward with the first through hole as a highest point; and a microchip that includes a sample liquid inlet into which the sample liquid that has flowed out from the sample liquid accommodation container is introduced, a main channel through which the introduced sample liquid flows, and a sorting channel where target microparticles are sorted from the sample liquid that has flowed through the main channel, in which the sample liquid accommodation container and the microchip are coupled.

[9] A microparticle sorting device including a sample liquid accommodation container that includes:

a container main body that has a bottomed cylindrical shape with an opening at one end and a bottom surface portion at another end, and accommodates a sample liquid containing microparticles; and a lid body that has a top surface portion and seals the opening of the container main body, in which the top surface portion of the lid body has a first through hole, and

25 an inner surface of the top surface portion of the lid body
has an inclined surface inclined upward with the first
through hole as a highest point.

[10] The microparticle sorting device according to [9],
further including a sample liquid stirring device that
includes: a fixing portion that fixes the sample liquid accom-
modation container in such a way that a radial direction of
the sample liquid accommodation container is horizontal;
and a rotation portion that causes the fixing portion to
perform a horizontal circular motion.

[11] The microparticle sorting device according to [9] or
[10], further including:
a microchip that includes a sample liquid inlet into which
the sample liquid containing the microparticles is intro-
duced, a main channel through which the introduced
sample liquid flows, and a sorting channel where target
microparticles are sorted from the sample liquid that
has flowed through the main channel;
a chip insertion unit into which the microchip is inserted;
a light irradiation unit that irradiates the microparticles
flowing through the main channel with light;
a light detection unit that detects scattered light and/or
fluorescence emitted from the microparticles; and
a control unit that controls a traveling direction of the
microparticles flowing through the main channel on the
basis of data detected by the light detection unit.

[12] The microparticle sorting device according to [11], in
which
the sample liquid accommodation container and the
microchip are coupled, and
a liquid feeding mechanism that feeds the sample liquid
from the sample liquid accommodation container to the
microchip is further included.

[13] The microparticle sorting device according to [12], in
which the sample liquid accommodation container and the
microchip that are coupled are a part of a microparticle
sorting kit.

REFERENCE SIGNS LIST

1 Sample liquid accommodation container
10 Container main body
11 Opening
12 Bottom surface portion
12a Deepest portion
12b Inclined surface inclined downward toward deepest
portion
13 Body portion
20 Lid body
21 Top surface portion
21a Top surface edge
21b Inclined surface inclined upward with first through
hole as highest point
22 Side surface portion
25 First through hole
26 Second through hole
27 Third through hole
30 Vent pipe
40 Outflow channel
50 Inflow channel
100 Microchip
200 Microparticle Sorting Kit
300 Microparticle sorting device
301 Chip insertion unit
302 Light irradiation unit
303 Light detection unit
304 Control unit

26

500 Sample liquid stirring device
510 Fixing portion
520 Rotation portion

The invention claimed is:
1. A sample liquid accommodation container comprising:
a container main body that has a bottomed cylindrical
shape with an opening at one end and a bottom surface
portion at another end, and accommodates a sample
liquid containing microparticles; and
a lid body that has a top surface portion and seals the
opening of the container main body,
wherein the top surface portion of the lid body has a first
through hole, and
an inner surface of the top surface portion of the lid body
has an inclined surface inclined upward with the first
through hole as a highest point,
wherein the sample liquid accommodation container is
coupled with a microchip that includes a sample liquid
inlet into which the sample liquid containing the
microparticles is introduced, a main channel through
which the introduced sample liquid flows, and a sorting
channel where target microparticles are sorted from the
sample liquid that has flowed through the main chan-
nel;
a chip insertion unit into which the microchip is inserted;
a light that irradiates the microparticles flowing through
the main channel with light;
a light detector that detects scattered light and/or fluores-
cence emitted from the microparticles; and
a controller that controls a traveling direction of the
microparticles flowing through the main channel on a
basis of data detected by the light detector.

2. The sample liquid accommodation container according
to claim 1, wherein an inner surface of the bottom surface
portion of the container main body has a deepest portion
where a depth of the container main body is greatest and an
inclined surface inclined downward toward the deepest
portion.

3. The sample liquid accommodation container according
to claim 1, wherein
the sample liquid accommodation container includes an
outflow channel for allowing the sample liquid to flow
out from the container main body,
the top surface portion of the lid body has a second
through hole, and
the outflow channel passes via the second through hole,
and has one end that abuts against an inner surface of
the bottom surface portion of the container main body.

4. The sample liquid accommodation container according
to claim 1, wherein
the top surface portion of the lid body has a third through
hole,
the sample liquid accommodation container includes an
inflow channel for allowing the sample liquid to flow
into the container main body, and
the inflow channel passes via the third through hole,
and has one end that is located upward with respect
to a liquid level of the sample liquid inside the
container main body.

5. The sample liquid accommodation container according
to claim 1, wherein the microparticles are bioparticles.

6. The sample liquid accommodation container according
to claim 5, wherein the bioparticles are cells.

7. A microparticle sorting device comprising
a sample liquid accommodation container that includes:
a container main body that has a bottomed cylindrical
shape with an opening at one end and a bottom surface portion at another end, and accommodates a sample liquid containing microparticles; and a lid body that has a top surface portion and seals the opening of the container main body, wherein the top surface portion of the lid body has a first through hole, and an inner surface of the top surface portion of the lid body has an inclined surface inclined upward with the first through hole as a highest point;

a microchip that includes a sample liquid inlet into which the sample liquid containing the microparticles is introduced, a main channel through which the introduced sample liquid flows, and a sorting channel where target microparticles are sorted from the sample liquid that has flowed through the main channel;

a chip insertion unit into which the microchip is inserted;

a light that irradiates the microparticles flowing through the main channel with light;

a light detector that detects scattered light and/or fluorescence emitted from the microparticles; and a controller that controls a traveling direction of the microparticles flowing through the main channel on a basis of data detected by the light detector.

8. The microparticle sorting device according to claim 7, further comprising a sample liquid stirring device that includes: a fixing portion that fixes the sample liquid accommodation container in such a way that a radial direction of the sample liquid accommodation container is horizontal; and a rotation portion that causes the fixing portion to perform a horizontal circular motion.

9. The microparticle sorting device according to claim 7, wherein the sample liquid accommodation container and the microchip are coupled, and a liquid feeding mechanism that feeds the sample liquid from the sample liquid accommodation container to the microchip is further included.

10. The microparticle sorting device according to claim 9, wherein the sample liquid accommodation container and the microchip that are coupled are a part of a microparticle sorting kit.

\* \* \* \* \*